(12) United States Patent
Dewhirst et al.

(10) Patent No.: US 12,305,539 B2
(45) Date of Patent: May 20, 2025

(54) TURBINE

(71) Applicant: Cummins Ltd, London (GB)

(72) Inventors: Robert Dewhirst, Huddersfield (GB); Carl M. Wilson, Huddersfield (GB)

(73) Assignee: Cummins Ltd., London (GB)

( * ) Notice: Subject to any disclaimer, the term of this patent is extended or adjusted under 35 U.S.C. 154(b) by 0 days.

(21) Appl. No.: 18/711,350

(22) PCT Filed: Nov. 17, 2022

(86) PCT No.: PCT/GB2022/052915
§ 371 (c)(1),
(2) Date: May 17, 2024

(87) PCT Pub. No.: WO2023/089316
PCT Pub. Date: May 25, 2023

(65) Prior Publication Data
US 2025/0020066 A1    Jan. 16, 2025

(30) Foreign Application Priority Data
Nov. 18, 2021 (GB) ..................... 2116678

(51) Int. Cl.
*F01D 9/04* (2006.01)
*F01D 25/16* (2006.01)
*F01D 25/24* (2006.01)

(52) U.S. Cl.
CPC .............. *F01D 9/041* (2013.01); *F01D 25/16* (2013.01); *F01D 25/243* (2013.01); *F05D 2220/40* (2013.01); *F05D 2240/128* (2013.01)

(58) Field of Classification Search
CPC ........ F01D 9/041; F01D 25/16; F01D 25/243; F05D 2220/40; F05D 2240/128
See application file for complete search history.

(56) References Cited

U.S. PATENT DOCUMENTS 7,407,364 B2 * 8/2008 Arnold ................ F04D 29/4213
  415/58.4
10,662,871 B2 * 5/2020 Asakawa ................ F02B 37/24
(Continued)

FOREIGN PATENT DOCUMENTS

GB         2562501 A     11/2018
WO      2019021027 A1     1/2019
WO  WO-2024170888 A1 *   8/2024

OTHER PUBLICATIONS

International Search Report and Written Opinion for International patent application No. PCT/GB2022/052915, filed Nov. 17, 2022, mailed Feb. 28, 2023.
(Continued)

*Primary Examiner* — Jesse S Bogue
(74) *Attorney, Agent, or Firm* — Faegre Drinker Biddle & Reath LLP (57) ABSTRACT

There is provided a nozzle ring for a turbine of a turbocharger. The nozzle ring comprises: a nozzle dividing wall, at least on nozzle vane, and a circumferentially extending outer rim. The nozzle dividing wall extends generally perpendicular to a longitudinal axis of the nozzle ring. The at least one nozzle vane extends from the nozzle dividing wall and has a leading edge defining a first radius relative to the longitudinal axis. The circumferentially extending outer rim defines a second radius relative to the longitudinal axis. The ratio of the second radius to the first radius is at least around 1.05.

18 Claims, 5 Drawing Sheets

(56) References Cited

U.S. PATENT DOCUMENTS

| | | | |
|---|---|---|---|
| 10,900,415 B2 * | 1/2021 | Eckl | F02C 6/12 |
| 10,907,496 B2 * | 2/2021 | Shioya | F02C 6/12 |
| 2010/0310363 A1 * | 12/2010 | Matsuyama | F01D 17/165 |
| | | | 415/212.1 |
| 2018/0328281 A1 | 11/2018 | Eckl | |

OTHER PUBLICATIONS

Kruiswyk, et al. "Investigation of the Relative Performance of Vaned an Vaneless Mixed Flow Turbines for Medium and Heavy-Duty Diesel Engine Applications with Pulse Exhaust Systems", published Apr. 6, 2021, SAE Technical Paper 2021-01-0644, 2021, doi: 10.4271/2021-01-0644.

International Preliminary Report on Patentability received for PCT Patent Application No. PCT/GB2022/052915, mailed on May 30, 2024, 7 pages.

\* cited by examiner

TURBINE

CROSS-REFERENCE TO RELATED APPLICATIONS

This application claims priority to and is a U.S. national stage application of International Patent Application No. PCT/GB2022,052915, filed Nov. 17, 2022, which claims priority to UK Patent Application No. 2116678.0, filed on Nov. 18, 2021, the disclosures of which are hereby incorporated herein by reference in their entirety.

The present invention relates to a turbine, and in particular a twin-entry turbine comprising a divided nozzle ring which exhibits reduced leakage between opposite sides of the nozzle ring dividing wall.

Turbochargers are well known devices for supplying air to the intake of an internal combustion engine at pressures above atmospheric pressure (boost pressures). A conventional turbocharger comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted; a circumferentially extending inlet passageway defined between opposing walls arranged around the turbine chamber; an inlet volute arranged around the inlet passageway; and an outlet passageway extending from the turbine chamber. The passageways and chambers communicate such that pressurised exhaust gas admitted to the inlet volute flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway towards the direction of rotation of the turbine wheel.

Turbines may be of a fixed or variable geometry type. Variable geometry type turbines comprise mechanisms which permit the geometry of the inlet passageway to be varied during use. Fixed geometry type turbines do not comprise such mechanisms, and therefore the geometry of the inlet passages of a fixed geometry turbine cannot be adjusted during use.

Turbines may be of a single-entry or multiple-entry type. Single-entry turbines comprise a single inlet volute that typically receives all of the exhaust gas from an internal combustion engine. Multiple-entry turbines comprise more than one volute which typically receive separate streams of exhaust gas from different cylinder banks of an internal combustion engine. One form of multiple-entry turbine is a "twin-entry" turbine in which two volutes extend circumferentially with one another around the turbine axis in angular alignment with one another. In such "twin-entry" turbines, a dividing wall is used to separate the volutes from one another.

In multiple-entry turbines, the exhaust gas streams in the different inlet volutes will exhibit transient pressure pulses caused by the separate cylinder banks. Often this means that when a first volute exhibits high pressure an adjacent second volute exhibits low pressure. If the pressure difference between the two volutes is high enough, this will cause exhaust gas from the first (higher pressure) volute to spill over the dividing wall from into the second (lower pressure) volute. The presence of the high pressure gas in the second volute forms a fluid blockage which may impede exhaust gas flow through the second volute during the next exhaust gas cycle and thereby increase the pumping work required by the engine and resulting in engine energy losses. During the next exhaust gas cycle, high pressure gas in the second volute may spill over the dividing wall into the first volute to form a fluid blockage in the first volute. Such fluid interaction between the different volutes is known as "cross-talk".

It is beneficial to keep inlet flow streams separated from one another until close as possible to the turbine wheel. By keeping the two flows separate until just before the turbine wheel, this increases the relative pressure difference between the two volutes required for cross-talk to occur. Therefore, in fixed geometry turbines comprising nozzle vanes, the dividing wall often extends through the nozzle vanes, for example in a plane generally orthogonal to the turbine axis. This ensures that the inlet flows remain separated until downstream of the trailing edges of the nozzle vanes, which are positioned in close proximity to the inducer of the turbine wheel.

Due to the complex geometry of the dividing wall and the nozzle ring, it is generally not possible to manufacture nozzle vanes integrally with the turbine housing. Accordingly, it is common for such turbines to comprise a nozzle ring and a turbine housing that are separate to one another. In such constructions, the nozzle ring defines the nozzle vanes and the portion of the dividing wall that passes through the nozzle vanes, whilst the turbine defines the inlet volutes and the portion of the dividing wall positioned between the inlet volutes. Because the nozzle ring and the turbine housing are separate to one another, an interface is defined between the portion of the dividing wall defined by the nozzle ring and the portion of the dividing wall defined by the turbine housing. The interface effectively acts as a narrow clearance that allows some exhaust gas to pass therethrough, thus enabling cross-talk to occur before the nozzle ring and reducing the efficiency of the turbine.

It is an object of the present invention to mitigate or prevent leakage across a nozzle ring of a turbine. It is a further object of the invention to obviate or mitigate one or more disadvantages of the prior art whether described herein or elsewhere.

According to a first aspect of the invention, there is provided a nozzle ring for a turbine of a turbocharger, the nozzle ring comprising: a nozzle dividing wall extending generally perpendicular to a longitudinal axis of the nozzle ring; and at least one nozzle vane extending from the nozzle dividing wall and having a leading edge defining a first radius relative to the longitudinal axis; wherein the nozzle dividing wall further comprises a circumferentially extending outer rim defining a second radius relative to the longitudinal axis; and wherein the ratio of the second radius to the first radius is at least around 1.05.

The term "outer rim" is intended to encompass the radially outermost part of the dividing wall of the nozzle ring. In general, it is desirable for the nozzle dividing wall to be as thin as possible so that the flows either side of the dividing wall merge downstream of the dividing wall with little interference. Accordingly, on the outer edge of a dividing wall of a nozzle ring according to the prior art, there is little available space on the outer edge for the inclusion of sealing features. However, in the present invention, because the second radius is 1.05 times larger than the first radius, the nozzle dividing wall extends upstream of the nozzle vanes by a significant amount. Accordingly, the outer rim of the nozzle dividing wall is positioned away from the nozzle vanes, and therefore the width of the outer rim can be increased.

This provides multiple benefits. First, by increasing the width of the outer rim, the pipe friction exerted on any leaked fluid by the outer rim and a corresponding inner edge of a dividing wall of the turbine housing is increased. Accordingly, even without the presence of any sealing features, leakage across the interface between the inner edge of the housing dividing wall and the outer rim of the nozzle dividing wall is reduced and thus turbine efficiency is increased.

Secondly, increasing the width of the outer rim also increases the space available to incorporate sealing features into the interface between the inner edge of the housing dividing wall and the outer rim of the nozzle dividing wall which can further reduce leakage. In general, such sealing features will necessitate the use of geometries that protrude away from or that are recessed into one or both of the ends of the nozzle dividing wall and the housing dividing wall. Such protruding or recessed geometries are likely to introduce localised regions of high stress within the dividing walls, for example at edges or bends. Such stress concentrations are particularly exacerbated when the geometries concerned are narrow. During the life span of the turbine, the dividing walls are repeatedly heated to a high temperature by the exhaust gas during operation and subsequently cooled to ambient temperature when the turbine is not in use. This thermal loading increases the internal stresses experienced by the dividing walls and makes them liable to failure (e.g. cracking or the like). However, because the present invention enables the interface between the dividing walls to be widened, the geometries of the sealing features can in turn be made larger, thus reducing localised stresses and improving the life span of the turbine. Preferably, the ratio of the second radius to the first radius should be at least around 1.09, as this provides sufficient additional space to further include stress reducing features such as fillets and tapers.

It will be appreciated that when the nozzle ring comprises more than one nozzle vane, the additional nozzle vanes may not all lie on the same pitch circle, or may not have the same vane profiles. Accordingly, the leading edges of the nozzle vanes may define different radiuses from the longitudinal axis. In such circumstances it will be appreciated it may be appropriate to measure the first radius on the basis of a modal average value of the leading edges of the nozzle vanes. Because the first radius is based on the modal value, this ensures that the proportions between the outer rim and the nozzle vane(s) is based on the most common geometry of vane forming part of the nozzle ring, and not upon any outlying or extreme values.

The ratio of the second radius to the first radius may be at most around 1.4. If the ratio of the second radius to the first radius is increased too far this may have unintended results that could negatively impact the performance of the turbine. In particular, if the second radius is increased too far, it may be necessary to modify the shape of one of the inlet volutes to include additional material so that it can receive a threaded bore for a fastening element. Alternatively, it may be necessary to increase the size of the bearing housing, thus leading to increased manufacturing costs.

The nozzle dividing wall may comprise an annular flange from which the at least one nozzle vane extends, and wherein the outer rim is radially outwards of the annular flange relative to the longitudinal axis. In such embodiments, because the outer rim is radially outwards of the annular flange, the outer rim is also radially outwards of the nozzle vanes. Accordingly, the increased thickness of the outer rim does not interfere with the flow of the exhaust gas through the nozzle vanes.

The outer rim may define a first width and the annular flange defines a second width, the first width being wider than the second width. In such embodiments, because the first width is wider than the second width, the outer rim has increased space along the turbine axis to accommodate sealing features.

The ratio of the first width to the second width may be at most around 3. The ratio of the first width to the second width may be at least around 2.

The nozzle dividing wall may comprise a neck that transitions in thickness between the outer rim and the annular flange. In such embodiments, the neck helps to distribute internal stresses within the nozzle dividing wall so as to reduce the risk of material failure under thermal loading. The neck may, in particular, transition smoothly in thickness between the outer rim and the annular flange, and include, for example, radiused (i.e. filleted edges) and one or more tapered portions.

The outer rim of the nozzle dividing wall may comprise a circumferentially extending groove configured to receive a sealing element.

According to a second aspect of the present invention there is provided a nozzle ring assembly comprising: a nozzle ring according to the first aspect of the invention, wherein the nozzle ring is a first nozzle ring; and a second nozzle ring, the second nozzle ring comprising: a side wall extending generally perpendicular to the longitudinal axis; and at least one nozzle vane extending from the side wall; wherein the at least one nozzle vane 35 of the first nozzle ring is configured to engage a radially extending surface of a turbine housing such that the nozzle dividing wall of the first nozzle ring and the turbine housing define a first inlet passage therebetween, and wherein the at least one nozzle vane of the second nozzle ring is configured to engage the nozzle dividing wall of the first nozzle ring such that the side wall of the second nozzle ring and the nozzle dividing wall of the first nozzle ring define a second inlet passage therebetween. In such embodiments, the first inlet passage may be configured to receive exhaust gas from a first inlet volute and the second inlet passage may be configured to receive exhaust gas from a second inlet volute. Furthermore, the first and/or second inlet passages may be generally annular in shape.

The second nozzle ring may comprise an axially extending flange defining a third radius relative to the longitudinal axis, and wherein the third radius is equal to or greater than the second radius. The axially extending flange may comprise at least one circumferentially extending groove configured to receive a sealing element.

According to a third aspect of the present invention, there is provided a turbine for a turbocharger, the turbine comprising: a turbine wheel supported for rotation about a turbine axis; a turbine housing comprising: a first volute housing portion at least partially defining a first inlet volute; a second volute housing portion at least partially defining a second inlet volute; a housing dividing wall at least partially defining the first and second inlet volutes so as to separate the first inlet volute from the second inlet volute; and a nozzle ring according to the first aspect of the invention or a nozzle ring assembly according to the second aspect of the invention, the nozzle ring or nozzle ring assembly being arranged such that the longitudinal axis is collinear with the turbine axis; wherein the nozzle dividing wall and the housing dividing wall are substantially aligned with one another along the turbine axis.

The second volute housing portion may further comprise an inner surface at least partially defining an aperture configured to receive the nozzle ring, and wherein the inner surface defines a radius relative to the turbine axis that is equal to or greater than the second radius. In such embodiments, because radius of the inner surface is greater than second radius, the nozzle ring can be received through the aperture. The radius of the inner surface of the second volute housing portion may be generally equal to the third radius described above.

The turbine may further comprise a bearing housing comprising bearings configured to support the turbine wheel for rotation, the bearing housing further comprising a mounting flange configured for connection to the second volute housing portion.

The second volute housing portion may comprise a threaded bore configured to receive a fastening element. The turbine may further comprise a holding plate having an aperture through which the fastening element is received to fasten the holding plate to the second volute housing portion. The holding plate may extend radially inwards such that it overlaps with a portion of the mounting flange of the bearing housing to fasten the turbine housing to the bearing housing.

The mounting flange of the bearing housing may comprise a threaded bore configured to receive a fastening element. The turbine may further comprise a holding plate having an aperture through which the fastening element is received to fasten the holding plate to the mounting flange. The holding plate may extend radially outwards such that it overlaps with a portion of the second volute housing portion of the turbine housing to fasten the turbine housing to the bearing housing.

The turbine may further comprise a sealing element disposed between the nozzle dividing wall and the housing dividing wall to substantially form a seal therebetween. One or both of the nozzle dividing wall and the housing dividing wall may comprise a circumferentially extending groove. The sealing element may comprise a laminar labyrinth seal ring.

A detailed description of the invention is provided below with reference to the accompanying drawings, in which.

It is an object of the present invention to obviate or mitigate one or more disadvantages of known turbines, whether mentioned above or otherwise. It is also an object of the present invention to provide for an improved or alternative turbine in which the prevalence of cross-talk is reduced.

Figure 1:
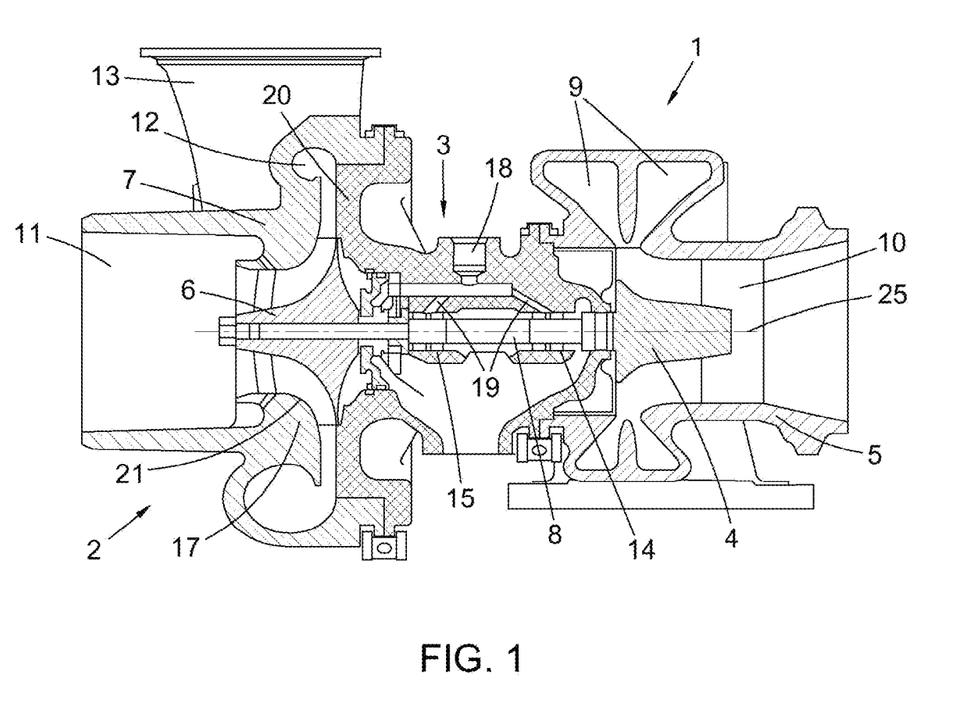
FIG. 1 is a cross-sectional drawing of a known turbocharger.

FIG. 1 shows a schematic cross-section through a known turbocharger. The turbocharger comprises a turbine 1 joined to a compressor 2 via a central bearing housing 3. The turbine 1 comprises a turbine wheel 4 for rotation within a turbine housing 5. Similarly, the compressor 2 comprises a wheel 6, of the centrifugal type, which can rotate within a compressor housing 7. The compressor housing 7 defines a compressor chamber within which the compressor wheel 6 can rotate. The turbine wheel 4 and compressor wheel 6 are mounted on opposite ends of a common turbocharger shaft 8 which extends through the central bearing housing 3.

The turbine housing 5 has two inlet volutes 9 located annularly around the turbine wheel 4, and an axial exhaust gas outlet 10. The inlet volutes 9 are configured to receive exhaust gas from separate cylinder banks of the internal combustion engine. The compressor housing 7 has an axial air intake passage (compressor inlet) 11 and an outlet volute 12 arranged annularly around the compressor chamber. The outlet volute 12 is in gas flow communication with a compressor outlet 13 that delivers the compressed air onwards to an internal combustion engine (not shown).

The bearing housing 3 defines a bearing chamber through which the turbocharger shaft 8 passes. The shaft 8 is rotatably supported by a bearing assembly which comprises two journal bearings 14 and 15 housed towards the turbine end and compressor end respectively of the bearing housing 3. Oil is supplied to the bearing assembly from the oil system of the internal combustion engine via oil inlet 18 and is fed to the bearings 14, 15 by oil passageways 19. The oil fed to the bearings 14, 15 may be used to both lubricate the bearings and to remove heat from the bearings.

In use, the turbine wheel 4 is rotated about an axis 25 by the passage of exhaust gas from the exhaust gas inlet 9 to the exhaust gas outlet 10. Exhaust gas is provided to exhaust gas inlet 9 from an exhaust manifold (also referred to as an outlet manifold) of the engine. The turbine wheel 4 in turn rotates the compressor wheel 6 which thereby draws intake air through the compressor inlet 11 and delivers boost air to an inlet manifold of the engine via the volute 12 and then the outlet 13.

The compressor chamber is defined between a shroud portion 17 of the compressor housing 7 and a hub portion 20 of the bearing housing 3. The compressor housing 7 shown in FIG. 1 may be formed as a one-piece (i.e. integral) unit including the shroud portion 17, although in alternative embodiments may comprise multiple components. The shroud portion 17 has an inwardly facing shroud surface 21 which is circularly symmetric about the rotational axis 25.

Figure 2:
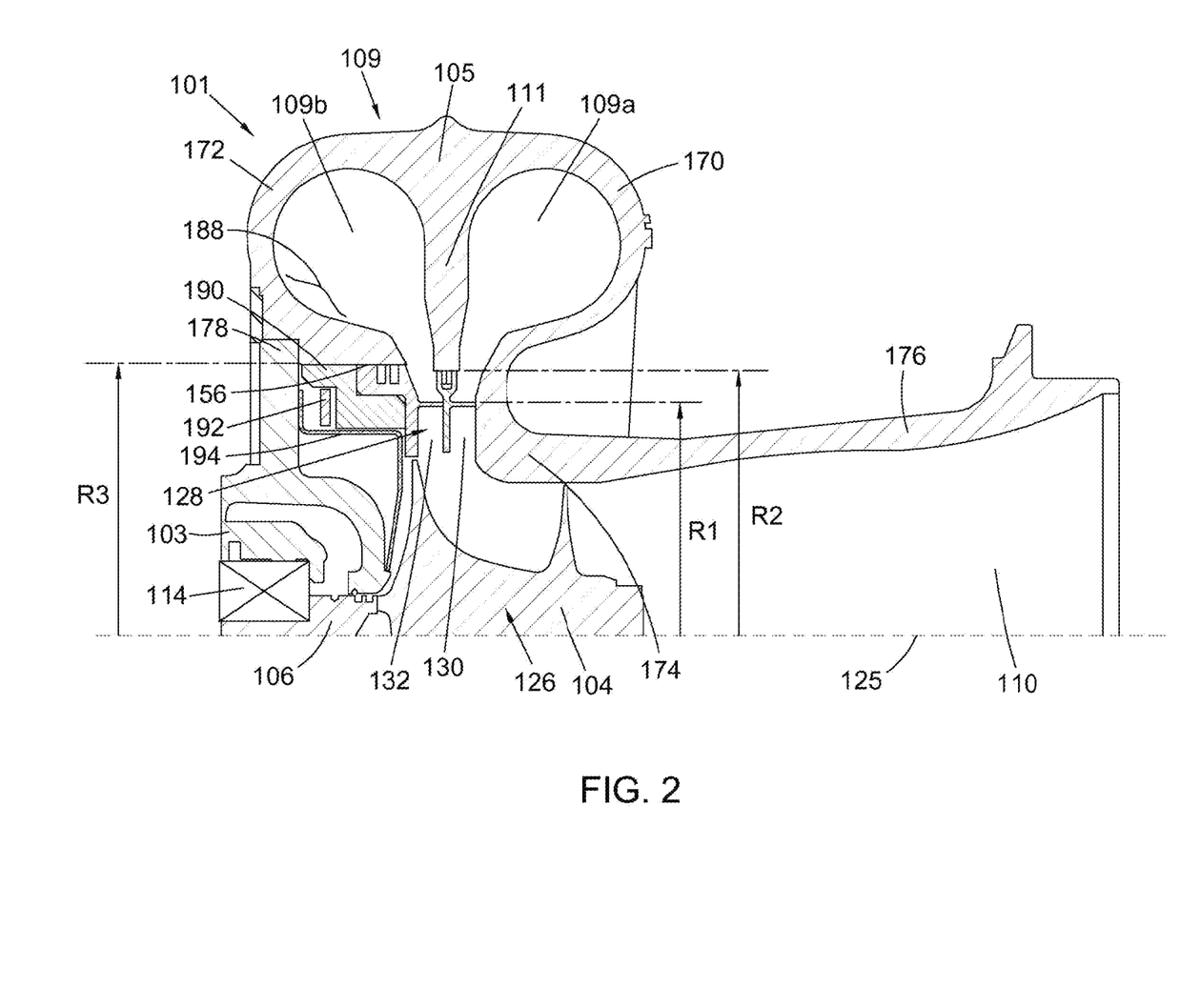
FIG. 2 is a cross-sectional drawing of a turbine according to the present invention taken through a leading edge of a nozzle vane.

FIG. 2 shows a cross-sectional view of a portion of a turbine 101 according to the present invention. The turbine 101 comprises a turbine wheel 104, a turbine housing 105 and a nozzle ring assembly 128. The turbine wheel 104 is rotationally fixed to a turbocharger shaft 106 that is supported for rotation about a turbine axis 125 by bearings 114 in a bearing housing 103. The turbine housing 105 defines a turbine inlet 109, a turbine wheel chamber 126 and a turbine outlet 110. The turbine inlet 109 comprises first and second inlet volutes 109*a*, 109*b* which extend circumferentially and co-extensively around the turbine axis 125. The inlet volutes 109*a*, 109*b* are separated by a radially extending housing dividing wall 111, and are fluidly connected to separate exhaust manifolds serving separate cylinder banks of the internal combustion engine (not shown).

During use, exhaust gas from the internal combustion engine passes from the inlet volutes 109*a*, 109*b* through the nozzle ring assembly 128 to the turbine wheel 104. The exhaust gas impacts the turbine wheel blades, causing the turbine wheel 104 to rotate about the turbine axis 125. The reaction force of the turbine wheel blades on the exhaust gas redirects the exhaust gas in a generally axial direction along the turbine axis 125 and into the turbine outlet 110. The turbine outlet 110 is tapered outwardly so that it defines a diffuser, however in alternative embodiments the turbine outlet 110 may be substantially straight. The exhaust gas in the turbine outlet 110 is then passed to an aftertreatment system (not shown) downstream of the turbine outlet 110 to remove harmful substances from the exhaust gas before finally being vented to atmosphere.

The turbine wheel 104 is a so-called "radial" turbine wheel which receives exhaust gas from the inlet 109 in a generally radial direction relative to the turbine axis 125 and delivers the exhaust gas in a generally axial direction along the turbine axis 125 into the turbine outlet 110. However, in alternative embodiments the turbine wheel 104 may be a so-called "mixed-flow" turbine wheel which receives exhaust gas in a direction that extends both axially and radially relative to the turbine axis 125.

The nozzle ring assembly 128 comprises a first nozzle ring 130 and a second nozzle ring 132. The first and second nozzle rings 130, 132 are positioned axially adjacent to one another relative to the turbine axis 125, and are axially aligned with an inducer of the turbine wheel 104 relative to the turbine axis 125.

Figure 3:
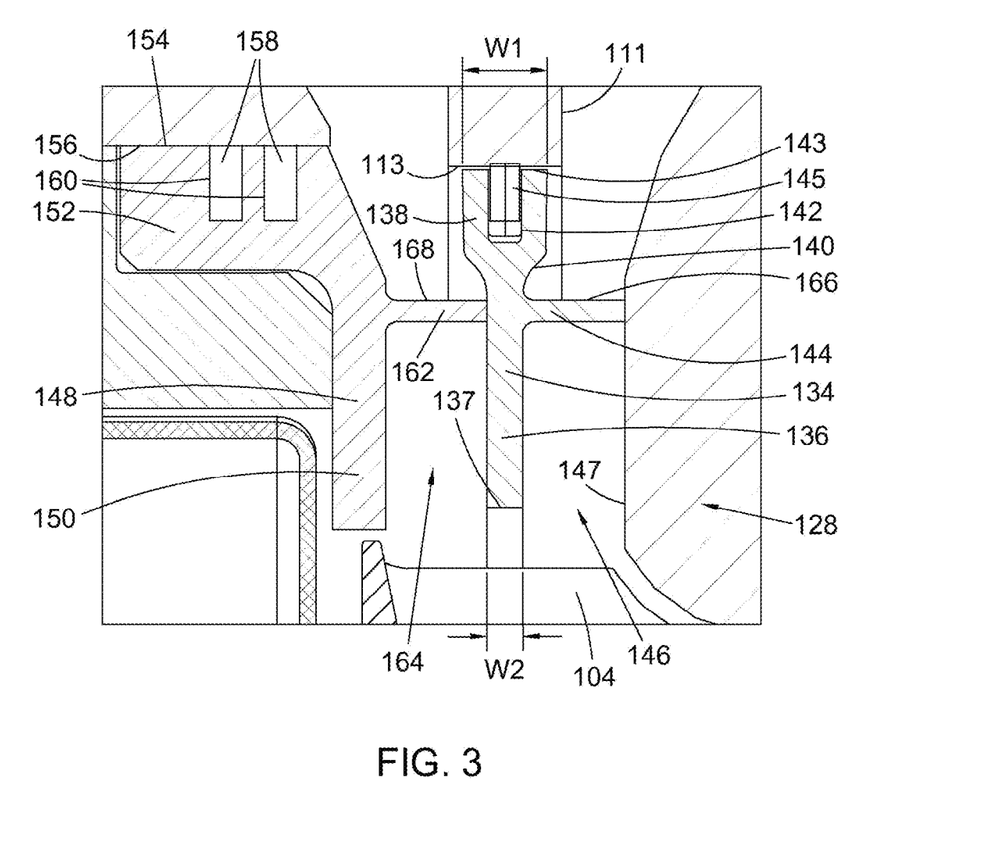
FIG. 3 is an enlarged cross-sectional view of a portion of the turbine of FIG. 2.

With reference to FIG. 3, the first nozzle ring 130 comprises a nozzle dividing wall 134 having a radially extending and generally annular flange 136. The flange 136 defines an inner edge 137 and an outer rim 138 joined to the flange 136 via a neck 140. The outer rim 138 extends circumferentially around the turbine axis 125 and defines a generally U-shaped cross-section comprising an inwardly recessed and circumferentially extending groove 142. The outer rim 138 further defines a pair of generally cylindrical end faces 143 delimiting the maximum extent of the dividing wall 134 in the radial direction from the turbine axis 125. The outer rim 138 of the nozzle dividing wall 134 is axially aligned with a generally cylindrical inner edge 113 of the housing dividing wall 111 such that the first nozzle ring 130 is received within a generally cylindrical region of space bounded by the inner edge 113 of the housing dividing wall 111. In order to permit receipt of the first nozzle ring 130 by the housing dividing wall 111, a narrow clearance exists between the inner edge 113 of the housing dividing wall 111 and the cylindrical end faces 143 of the nozzle dividing wall 134.

The first nozzle ring 130 further comprises a plurality of first nozzle vanes 144 that protrude from the flange 136 of the dividing wall 134 from a position radially inward of the neck 140. The vanes 144 extend along the turbine axis 125 towards a radially extending wall 147 of the turbine housing 105 that faces towards the bearing housing 103 along the turbine axis 125. The dividing wall 134 and the wall 147 of the turbine housing together define a generally annular first inlet passage 146 that receives exhaust gas from the first inlet volute 109*a*.

The second nozzle ring 132 defines a side wall 148 comprising a radially extending flange 150 and an axially extending flange 152, both of which also extend circumferentially around the turbine axis 125. The axially extending flange 152 extends along the turbine axis 125 towards the bearing housing 103 and comprises a generally cylindrical outer surface 154 that is received by a corresponding cylindrical inner surface 156 of the turbine housing 105 (described below). The axial flange 152 comprises pair of circumferentially extending and inwardly recessed grooves 158 within which a pair of sealing elements 160 are received. However, in further embodiments the grooves 158 may be additionally or alternatively formed by the second volute portion 172 of the turbine housing 105. The sealing elements are in particular piston rings. However, in alternative embodiments substantially any suitable sealing element may be used, for example labyrinth seal rings (also called spiral wound or laminar seal rings).

The second nozzle ring 132 further comprises a plurality of second nozzle vanes 162 which extend from the radial flange 150 of the side wall 148 towards the flange 136 of the dividing wall 134 of the first nozzle ring 130. The second nozzle ring 132 and the first nozzle ring 130 together define a generally annular second inlet passage 164 that receives exhaust gas from the second inlet volute 109*b*.

The plurality of first nozzle vanes 144 and the plurality of second nozzle vanes 162 are generally aligned with one another such that they are effectively co-linear in a direction parallel to the turbine axis 125. Additionally, in the present embodiment the plurality of first nozzle vanes 144 and the plurality of second nozzle vanes 162 share identical vane profiles, a common pitch circle diameter such that they are all positioned at the same radius from the turbine axis 125, and a common pitch distance such that they are positioned at equal intervals to one another.

However, in alternative embodiments substantially any arrangement of vanes may be used. For example, the plurality of first nozzle vanes 144 may be rotationally offset from the plurality of second nozzle vanes 162. Furthermore, the first nozzle ring 130 may comprise more or fewer nozzle vanes 144 than the second nozzle ring 132. Additionally, the nozzle vanes 144, 162 of the first and second nozzle rings 130, 132 may be equally or unequally spaced. Furthermore, the vanes may have different vane profile to one another such that they are not all identical.

Each of the plurality first nozzle vanes 144 define a first nozzle vane leading edge 166 and each of the plurality of second nozzle vanes 162 defines a second nozzle vane leading edge 168. With reference to FIG. 2, the first and second nozzle vane leading edges 166, 168 define a first radius R1 relative to the turbine axis 125. The cylindrical end faces 143 of the outer rim 138 of the dividing wall 134 of the first nozzle ring 130 define a second radius R2 relative to the turbine axis 125. In the present embodiment, the ratio of the second radius to the first radius (R2:R1) is around 1.12.

During use, the pressure in the first and second inlet volutes 109*a*, 109*b* will vary in response to the firing cycles of the cylinders to which they are connected. Accordingly, the pressure in the inlet volutes 109*a*, 109*b* will vary independent of one another. This causes a transiently fluctuating pressure difference between the two inlet volutes 109*a*, 109*b* which in turn creates a propensity for exhaust gas to pass through the clearance between the two volutes 109*a*, 109*b* resulting in so-called "cross-talk".

However, in the present invention, because the ratio of the second radius to the first radius (R2:R1) is around 1.12, this means that the second radius R2 is significantly larger than the first radius R1. Accordingly, the outer rim 138 of the nozzle dividing wall 134 is moved radially outwards to a region of space where the shape of the volutes 109*a*, 109*b* begin to taper outwardly and where the housing dividing wall 111 thickens. As a result, this permits the outer rim 138 of the nozzle dividing wall 134 of the first nozzle ring 130 to be made wider in a direction parallel to the turbine axis 125. Put another way, increasing the size of the second radius R2 relative to the first radius R1 moves the outer rim 138 away from the nozzle vanes 144 to a position upstream of the first and second annular inlet passages 146, 164 where more space is available in the axial direction. Consequently, the width of the outer rim 138 can be increased.

Increasing the width of the outer rim 138 provides two key advantages. First, it increases the distance between the first and second inlet volutes 109*a*, 109*b* along the clearance between the outer cylindrical surfaces 143 of the nozzle dividing wall 134 and the inner edge 113 of the housing dividing wall 111. Accordingly, even without the presence of any sealing features (for example if the groove 142 was not present) the leaked exhaust gas will lose more energy to pipe friction than it would along a shorter passage, and therefore the amount of overall leakage will be reduced.

Secondly, increasing the width of the outer rim 138 enables the outer rim to accommodate mechanical sealing features. In the present embodiment, the flange 136 of the nozzle dividing wall 134 has a width of around 2 mm, which is too small to accommodate any mechanical sealing features. In particular, at such small geometries, any sealing features, for example comprising grooves or protrusions, would create localised regions of high stress. Because the nozzle dividing wall 134 is heated by the exhaust gas, the thermal loading on the high stress regions will make them liable to crack. However, in the present invention the width of the outer rim 138 is around 5 mm. Accordingly, any sealing features, such as the groove 142 in the present embodiment, can be made larger. The larger features exhibit lower internal stress concentrations and therefore are better able to withstand the thermal loading cycles of the exhaust gas.

To this end, in the present embodiment a sealing element 145 is received within the groove 142 of the outer rim 138. The sealing element 145 biases against the inner edge 113 of the housing dividing wall 111 to substantially form a seal against the inner edge 113 and thereby reduce or substantially prevent exhaust gas from passing through the clearance between the inner edge 113 of the housing dividing wall 111 and the cylindrical end faces 143 of the nozzle dividing wall 134. The sealing element 145 is in particular a labyrinth seal ring (otherwise known in the art as a "Fey ring", a spiral-wound ring or a laminar seal ring). Such laminar labyrinth seal rings are typically made from metal, and therefore provide the advantage that they can withstand high temperatures, such as those caused by the temperature of the exhaust gas passing through the turbine 101. However, in alternative embodiments substantially any suitable sealing element 145 can be used. For example, the sealing element 145 may be a piston ring (and in particular a piston ring of a construction in which the ends are overlapped), an o-ring, or the like.

By investigation, the inventors have found that the smallest that the ratio of the second radius R2 to the first radius R1 can be made to provide sufficient additional width at the outer rim 138 is around 1.05. However, in general it is beneficial for the ratio of the second radius R2 to the first radius R1 to be larger, as this increases the amount by which the width of the outer rim 138 can be increased. Preferably, the ratio of the second radius R2 to the first radius R1 should be at least around 1.09 as this will provide sufficient space to include stress-reducing features such as radiused (i.e. filleted) edges within the groove 142 and a smoothly tapered neck 140.

However, it has also been found that the ratio of the second radius to the first radius (R2:R1) cannot be extended indefinitely. In particular, with reference again to FIG. 2, it can be seen that the turbine housing 105 comprises a first volute housing portion 170 and a second volute housing portion 172. The first volute housing portion 170 and the housing dividing wall 111 together define the first volute 109*a*, and the second volute housing portion 172 and the dividing wall 111 together define the second volute 109*b*. The first volute housing portion 170 transitions into a turbine wheel chamber housing portion 174 which defines the turbine wheel chamber 126, and in turn the turbine wheel chamber housing portion 174 transitions into a turbine outlet housing portion 176 which defines the turbine outlet 110.

The second volute housing portion 172 is configured to connect the turbine housing 105 to the bearing housing 103. As mentioned previously, the second volute housing portion 172 comprises an inner cylindrical surface 156. The inner cylindrical surface 156 defines an aperture that is open on the bearing housing 103 side of the turbine housing 105 through which the nozzle ring assembly 128 can be received. In particular, the inner cylindrical surface 156 defines a third radius R3 relative to the turbine axis 125 which must be at least as large as the second radius R2 to permit the first nozzle ring 130 to be received by the turbine housing 105. In the case of the present embodiment, preferably the third radius R3 is slightly larger than the second radius R2 to permit additional clearance during assembly. In particular, the ratio of the third radius to the second radius (R3:R2) in the present embodiment is around 1.025. The precise ratio may be chosen in dependence upon, for example, the tolerance stack of any adjacent components. However, it will be appreciated that, in general, a greater or lesser size difference between the two radiuses may be used, provided that the third radius remains at least as large as the second radius.

It will be appreciated that the outer cylindrical surface 154 of the axial flange 152 second nozzle ring 132 is sized so that it can be received by the inner cylindrical surface 156 of the second volute housing portion 172. Accordingly, the second nozzle ring 132 comprises a radially outermost part that is for the purposes of this disclosure effectively equal to the third radius R3, and which is therefore at least as large as the second radius R2. Accordingly, the radially outermost part of the second nozzle ring 132 can be considered to define an outer rim having a radius of at least R2, and consequently the ratio of the outer cylindrical surface 154 (i.e. the outer rim of the second nozzle ring 132) to the radius of the leading edges of the plurality of second nozzle vanes 162 will be within the same ranges as disclosed herein in relation to the first nozzle ring 130.

Figure 4:
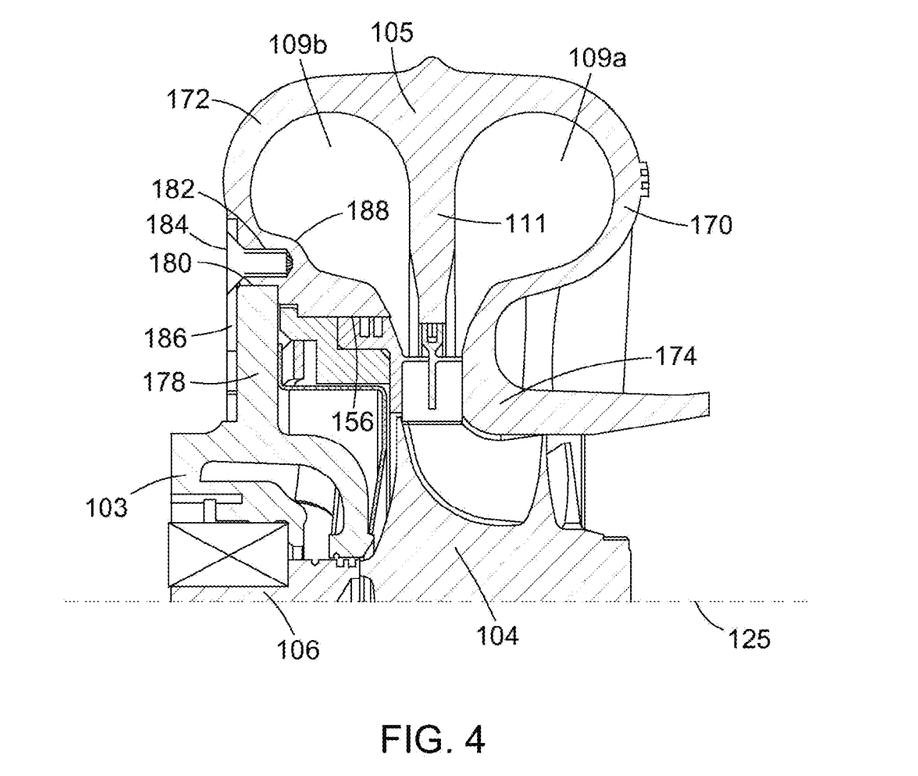
FIG. 4 is a cross-sectional drawing of the turbine of FIG. 2 taken through a mid-point of a fastener bore.

FIG. 4 shows a cross-sectional view of the turbine 101 taken from a different angular orientation to that of FIGS. 2 and 3. With reference to FIG. 4, the bearing housing 103 comprises a bearing housing mounting flange 178 which extends radially relative to the turbine axis 125 from the bearing housing 103. The second volute housing portion 172 comprises a recessed stepped section 180 configured to receive the mounting flange 178. The second volute housing portion 172 further comprises a threaded blind bore defining a fastening hole 182 positioned radially outwards of the stepped section 180. A fastening element in the form of a screw 184 is received within the fastening hole 182. The turbine 101 further comprises a holding plate 186 which extends in a radial direction relative to the turbine axis 125 and comprises an aperture through which the screw 184 is received. The holding plate 186 is compressed against the turbine housing 105 by the screw 184 and extends radially inwards so that it overlaps a portion of the mounting flange 178 of the bearing housing 103 such that the holding plate 186 secures the turbine housing 105 to the bearing housing 103. Although not shown, it will be appreciated that the turbine 101 comprises a plurality of such fastening holes 182, screws 184 and holding plates 186 distributed around the turbine axis 125. However, in alternative embodiments, the holding plates 186 may be replaced by a single annular plate that circumferentially surrounds the turbine axis.

As shown in FIG. 4, because the ratio of the second radius to the first radius (R2:R2) is relatively large compared to the prior art, this means that the radius of the inner cylindrical surface 156 of the second volute housing portion 172 (i.e. the third radius R3) has been pushed radially outwards to the point at which the inlet volutes 109a, 109b begin to flare outwardly in the axial direction. As a consequence, the radial position of the fastening hole 182 has also been pushed radially outwards. However, the fastening hole 182 must have a sufficient depth to receive the screw 184, and therefore this results in the formation of a protrusion 188 on the inside of the second inlet volute 109b. In the present embodiment, a separate protrusion 188 is formed around each fastening hole 182 such that there are a plurality of protrusions. However, in alternative embodiments an annular ridge may extend around the entire circumference of the second inlet volute 109b, such that the annular ridge accommodates all of the fastening holes 182.

During use, exhaust gas in the second inlet volute 109b will be deflected by the protrusion 188, which will therefore disturb flow through the second inlet volute 109b. This disturbance can result in increased turbulence, causing a pressure loss before the turbine wheel 104 and thus reducing the overall efficiency of the turbine 101. Accordingly, it is preferable that the size of the protrusion 188 is kept to a minimum. It has been found that a relatively small protrusion 188, such as the one shown in FIG. 4, does not produce a particularly significant negative effect on the efficiency of the turbine 101. However, it will be appreciated that as the ratio of the second radius to the first radius (R2:R1) is increased, the fastening hole 182 will need to be positioned radially further from the turbine axis 125, such that the protrusion 188 will increase in size. It has been found that in order to keep the protrusion 188 below a maximum acceptable size, it is preferable that the ratio of the second radius to the first radius (R2:R1) should be no more than 1.4.

In alternative embodiments, the turbine hosing 105 may have a "swept" or "lean-over" configuration in which the two turbine inlet volutes 109a, 109b are generally bent towards the turbine outlet 110 (i.e. in the plane of FIGS. 2 and 4). By changing the geometry of the turbine inlet volutes 109a, 109b, this vacates space on the bearing housing 103 side of the turbine inlet volutes 109a, 109b which can then be used to accommodate the fastening holes 182 without the need for any protrusions 188 which extend into the second inlet volute 109b. However, due to the necessity to provide sufficient flow area within the inlet volutes 109a, 109b, such embodiments generally increase the maximum radial extent of the turbine housing 105 and therefore may not be appropriate for all engine systems (particularly if the larger radius of the turbine housing 105 cannot be accommodated between other components of the engine).

With reference to FIG. 3, the outer rim 138 of the nozzle dividing wall 134 defines a first width W1 at the outer cylindrical surfaces 143, and the flange 136 of the nozzle dividing wall 134 defines a second width W2 at the inner edge 137. As described above, in the present embodiment the first width W1 is around 5 mm and the second width W2 is around 2 mm. Accordingly, the ratio of the first width W1 to the second width W2 is 2.5. It has been found that there is a natural lower limit to the thickness that any one part of the nozzle dividing wall 134 can be made. In general, the thickness of the thinnest part of the nozzle dividing wall 134 must be at least around 1.5 mm. With that in mind, the first width W1 must therefore be at least twice this minimum to define the flanks of the groove 142 plus the width of the groove 142 itself. By investigation it has been found that the ratio of the first width W1 to the second width W2 must be at least around 2.0. In general, it is preferable that the ratio of the first width W1 to the second with W2 is larger, so that more space can be used to accommodate sealing features. However, if the first width W1 increases too far, then the outer rim 138 may encroach into the inlet volutes 109a, 109b. Accordingly, it has been found that it is preferable for the ratio of the first width W1 to the second width W2 to be at most around 3.0.

Although the first and second nozzle rings 130, 132 are shown as separate pieces, it will be appreciated that in alternative embodiments the first and second nozzle rings 130, 132 may be integrally formed. In such embodiments, the nozzle ring assembly 128 may therefore define a single nozzle ring having a dividing wall. Furthermore, although the sealing element 143 of the first nozzle ring 130 is shown as being received within a groove 142 on the outer rim 138 of the first nozzle ring 130, it will be appreciated that in alternative embodiments the sealing element 143 may be received within a groove formed on the inner cylindrical edge 113 of the housing dividing wall 111, or may be received partially between corresponding grooves on the outer rim 138 of the first nozzle ring 130 and the inner edge 113 of the housing dividing wall 111. Furthermore, although the first nozzle ring 130 comprises a single groove 142, it will be appreciated that in alternative embodiments the first nozzle ring 130 may comprise more than one groove 142. For example, the first nozzle ring 130 may comprise a second groove spaced apart from the groove 142 along the turbine axis 125.

As shown in FIG. 3, it can be seen that the dividing wall 134 of the first nozzle ring 130 comprises a neck 140 which transitions between the outer rim 138 and the annular flange 136. In general, it is preferable for the annular flange 136 to be as thin as possible, so that the stream of exhaust gas passing through the annular first inlet passage 146 and the annular second inlet passage 164 are as close to one another in the axial direction so that they can be delivered to the inducer of the turbine wheel 104. Accordingly, in the present embodiment the flange 134 defines a constant width W2 from the inner edge 137, which is radially inwards of the trailing edges of the first nozzle vanes 144, to the neck 140, which is radially outwards of the leading edges of the first nozzle vanes 144. However, it will be appreciated that in alternative embodiments the dividing wall 134 may have any suitable shape provided that it is capable of directing the exhaust gases from the two inlet volutes 109a, 109b to the inducer of the turbine wheel 104. In particular, the dividing wall 134 may be tapered from the outer rim 138 (i.e. from the outer cylindrical surfaces 143) to the inner edge 137. This may be particularly beneficial for arrangements in which the turbine wheel 104 is configured to receive exhaust gas having a component of velocity along the turbine axis 125, for example in so-called "mixed flow" turbines.

With continued reference to FIG. 3, it can be seen that the length of the inner cylindrical surface 113 of the housing dividing wall 111 in the axial direction is larger than that of the corresponding length of the outer rim 138. In particular, as set out above, the thickness of the outer rim 138 is around 5 mm, whereas the thickness of the inner surface 113 of the housing dividing wall 111 is around 7 mm. Because the thickness of the inner surface 113 of the housing dividing wall is larger than the thickness of the outer rim 138, this means that the inner surface 113 can accommodate some axial misalignment of the nozzle dividing wall 134 relative to the housing dividing wall. In particular, the width of the inner surface 113 of the housing dividing wall 11 may be chosen in dependence upon the tolerances stack of any adjacent components, such that it can be ensured that the outer rim 138 of the nozzle dividing wall 134 does not protrude axially outwards either side of the maximum lateral width of the inner surface 113 the housing dividing wall 111. This ensures that the outer rim 138 of the nozzle dividing wall 134 does not present an impediment to flow in either stream of exhaust gas.

Returning to FIG. 2, it can be seen that the turbine 101 further comprises a spacer ring 190 (alternatively called a nozzle ring carrier), a biasing member 192 and a baffle 194. The spacer ring 190 defines a stepped cross-section, such that it is generally Z-shaped. The spacer ring 190 comprises a first portion that is sized to receive the axial flange 152 of the second nozzle ring 132 around its outer circumference, and a second portion that is sized to be received by the cylindrical inner surface 156 of the second volute housing portion 172 of the turbine housing 105. The second portion of the spacer ring 190 defines a shelf on a radially inner side thereof which is configured to receive the biasing member 190. The baffle 194 comprises a radially extending flange that is received between the biasing member 192 and the mounting flange 178 of the bearing housing. The baffle 194 further comprises an axially extending portion that extends towards the radially extending flange 150 of the second nozzle ring 132, and further comprises a central portion that extends radially inwards towards the portion of the bearing housing 103 through which the turbocharger shaft 106 extends into the turbine wheel chamber 126. During use, the biasing member 192 is compressed by the action of the fastening elements 184 (i.e. screws) and the holding plate 186 on the mounting flange 178 of the bearing housing 103 against the radially extending flange of the baffle 194 and the shelf of the spacer ring 190. The reaction of the biasing member 192 urges the spacer ring 190 against the second nozzle ring 132, which is urged in turn against the first nozzle ring 130 (via the plurality of second vanes 162), which is in turn urged against the radially extending wall 147 of the turbine housing 105. Accordingly, the biasing member 192 acts to ensure that the first and second nozzle rings 130, 132 are held in the correct axial position relative to the turbine wheel 104.

The spacer ring 190 may be made from a different material to the second nozzle ring 132 so as to save manufacturing costs. For example, due to their exposure to exhaust gas, it is preferable to manufacture the first and second nozzle rings 130, 132 from stainless steel as this provides good thermal performance and is corrosion-resistant. However, the spacer ring 190 is not exposed to exhaust gas and therefore may be made from a cheaper material such as cast iron, mild steel or the like.

Figure 5:
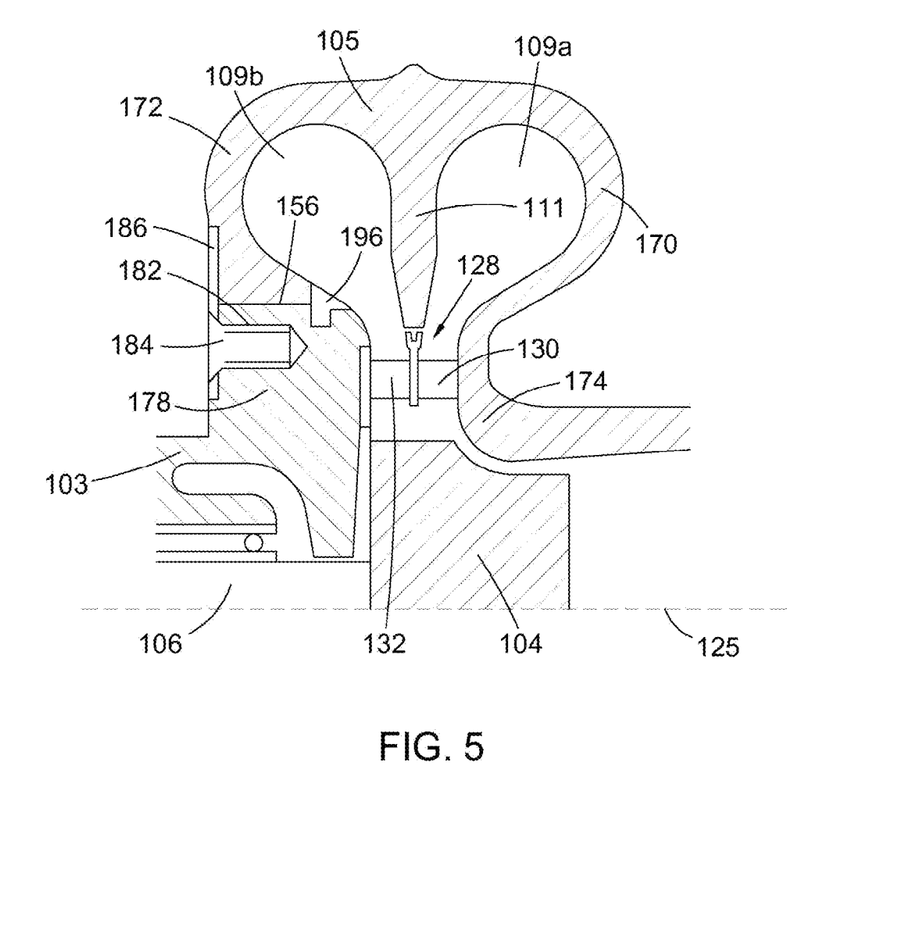
FIG. 5 is a cross-sectional schematic drawing of a further embodiment of a turbine according to the present invention.

FIG. 5 shows an alternative embodiment of a turbine 101 according to the present invention. The embodiment of FIG. 5 is substantially identical to the previously described embodiment aside from the following features described below. Whereas in the previous embodiment the fastening hole 182 is positioned in the second volute housing portion 172, in the embodiment of FIG. 5 the fastening hole 182 is positioned within the mounting flange 178 of the bearing housing 182. The holding plate 186 extends radially outwards and overlaps with the second volute housing portion 172 of the turbine housing 105. The mounting flange 178 of the bearing housing 103 further comprises a circumferentially extending groove within which a retaining ring 196 is received. The retaining ring 196 and the holding plate 196 act to hold the second volute housing portion 172 therebetween so as to secure the turbine housing 105 in position. The retaining ring 196 may be made in two or more pieces, each piece defining a separate part of its circumference, so that it can be received into the groove in a generally radial direction. As shown in the figure, the retaining ring 196 defines a portion of the inside of the second inlet volute 109b.

Because the fastening hole 182 is positioned in the mounting flange 178 of the fearing housing 103, the fastening hole 182 is positioned radially inwards of the inner cylindrical surface 156 of the second volute housing portion 172 of the turbine housing 105. Therefore, the need for a protrusion in the second inlet volute 109b is avoided, and consequently the second inlet volute 109b of the embodiment of FIG. 5 does not suffer from the drawbacks described above in relation to the previous embodiment. Accordingly, in the embodiment of FIG. 5, it is possible to increase the ratio of the second radius to the first radius (R2:R1) beyond the preferable maximum value of around 1.4 described above with less detriment to the aerodynamics in the second inlet volute 109b. Nevertheless, increasing the ratio of the second radius to the first radius (R2:R1) will increase the size of the bearing housing 103, and would therefore require a larger bearing housing casting and increased manufacturing costs. Accordingly, even in the embodiment of FIG. 5 it is still generally preferable for the ratio of the second radius to the first radius (R2:R1) to be at most around 1.4.

It should be noted that in order to accommodate the fastening hole 182, the mounting flange 178 of the bearing housing needs to be made significantly thicker. In particular, the bearing housing 103 may extend axially towards the nozzle ring assembly 128 and may define a portion of the second inlet passage 164. However, it will be appreciated that the precise construction of the bearing housing mounting flange 178 may be varied, provided that the mounting flange 178 is able to receive and hold the screws 184.

Although the embodiment of FIG. 5 comprises a retaining ring 196 to hold the turbine housing 105 in position, it will be appreciated that in alternative embodiments substantially any suitable means for preventing movement of the turbine housing 105 relative to the mounting flange 186 may be used. For example, the mounting flange 186 and the turbine housing 105 may define a bayonet fitting therebetween so that the mounting flange 186 substantially prevents movement of the turbine housing 105 in either direction along the turbine axis 125. Furthermore, the mounting flange 186 and the turbine housing 105 may define a screw connection therebetween. Other types of connection such as spring-loaded catches, snap-rings, keyways or the like may also be used.

Although the above described embodiments employ threaded bores (i.e. screw holes) which receive fastening elements (i.e. screws) to fix the bearing housing 103 to the turbine housing 105, it will be appreciated that in alternative embodiments substantially any suitable means for connecting the bearing housing 103 to the turbine housing 105 may be used. For example, this may include the use of keyways, splines, magnetic couplings, tension bands (i.e. so-called "v-bands") or the like.

Although the above described embodiments comprise a circumferentially extending groove 142 on the outer rim 138 of the nozzle dividing wall 134, it will be appreciated that in alternative embodiments the inner edge 113 of the housing dividing wall 111 may additionally or alternatively comprise a circumferentially extending groove within which the sealing element is at least partially received. When both the nozzle dividing wall 134 and the housing dividing wall 111 comprise circumferential grooves, the sealing element may act as a locating feature that aligns the nozzle dividing wall 134 with the housing dividing wall 111. When only the housing dividing wall 111 comprises the circumferentially extending groove, this provides additional lateral space to accommodate the groove, thus reducing internal stress concentrations.

The invention claimed is:

1. The nozzle ring for a turbine of a turbocharger, the nozzle ring comprising:
a nozzle dividing wall extending generally perpendicular to a longitudinal axis of the nozzle ring; and
at least one nozzle vane extending from the nozzle dividing wall and having a leading edge defining a first radius relative to the longitudinal axis;
wherein the nozzle dividing wall further comprises a circumferentially extending outer rim defining a second radius relative to the longitudinal axis; and
wherein the ratio of the second radius to the first radius is at least around 1.05, and wherein at least one of:
the nozzle dividing wall comprises an annular flange from which the at least one nozzle vane extends, and wherein the outer rim is radially outwards of
the annular flange relative to the longitudinal axis so as to facilitate widening of
the outer rim relative to the nozzle dividing wall and
the outer rim of the nozzle dividing wall comprises a circumferentially extending groove configured to receive a sealing element.

2. The nozzle ring according to claim 1, wherein the ratio of the second radius to the first radius is at most 1.4.

3. The nozzle ring according to claim 1, wherein the outer rim defines a first width and the annular flange defines a second width, the first width being wider than the second width.

4. The nozzle ring according to claim 3, wherein the ratio of the first width to the second width is at most 3.

5. The nozzle ring according to claim 3, wherein the ratio of the first width to the second width is at least 2.

6. The nozzle ring according to claim 1, wherein the nozzle dividing wall comprises a neck that transitions in thickness between the outer rim and the annular flange.

7. The nozzle ring assembly comprising:
a nozzle ring according to any preceding claim, wherein the nozzle ring is a first nozzle ring; and
a second nozzle ring, the second nozzle ring comprising: a side wall extending generally perpendicular to the longitudinal axis; and at least one nozzle vane extending from the side wall;
wherein the at least one nozzle vane of the first nozzle ring is configured to engage a radially extending surface of a turbine housing such that the nozzle dividing wall of the first nozzle ring and the turbine housing define a first inlet passage therebetween, and
wherein the at least one nozzle vane of the second nozzle ring is configured to engage the nozzle dividing wall of the first nozzle ring such that the side wall of the second nozzle ring and the nozzle dividing wall of the first nozzle ring define a second inlet passage therebetween.

8. The nozzle ring assembly according to claim 7, wherein the second nozzle ring comprises an axially extending flange defining a third radius relative to the longitudinal axis, and wherein the third radius is equal to or greater than the second radius.

9. The nozzle ring assembly according to claim 8, wherein the axially extending flange comprises at least one circumferentially extending groove configured to receive a sealing element.

10. The turbine for a turbocharger, the turbine comprising:
a turbine wheel supported for rotation about a turbine axis;
a turbine housing comprising:
a first volute housing portion at least partially defining a first inlet volute;
a second volute housing portion at least partially defining a second inlet volute;
a housing dividing wall at least partially defining the first and second inlet volutes so as to separate the first inlet volute from the second inlet volute; and
a nozzle ring or nozzle ring assembly according to any preceding claim, the nozzle ring or nozzle ring assembly being arranged such that the longitudinal axis is collinear with the turbine axis;
wherein the nozzle dividing wall and the housing dividing wall are substantially aligned with one another along the turbine axis.

11. The turbine according to claim 10, wherein the second volute housing portion further comprises an inner surface at least partially defining an aperture configured to receive the nozzle ring, and wherein the inner surface defines a radius relative to the turbine axis that is equal to or greater than the second radius.

12. The turbine according to claim 10, wherein the turbine further comprises a bearing housing comprising bearings configured to support the turbine wheel for rotation, the bearing housing further comprising a mounting flange configured for connection to the second volute housing portion.

13. The turbine according to claim 12, wherein:
the second volute housing portion comprises a threaded bore configured to receive a fastening element;
the turbine further comprises a holding plate having an aperture through which the fastening element is received to fasten the holding plate to the second volute housing portion; and
the holding plate extends radially inwards such that it overlaps with a portion of the mounting flange of the bearing housing to fasten the turbine housing to the bearing housing.

14. The turbine according to claim 12, wherein:
the mounting flange of the bearing housing comprises a threaded bore configured to receive a fastening element;
the turbine further comprises a holding plate having an aperture through which the fastening element is received to fasten the holding plate to the mounting flange; and
the holding plate extends radially outwards such that it overlaps with a portion of the second volute housing portion of the turbine housing to fasten the turbine housing to the bearing housing.

15. The turbine according to claim 10, wherein the turbine further comprises a sealing element disposed between the nozzle dividing wall and the housing dividing wall to substantially form a seal therebetween.

16. The turbine according to claim 15, wherein one or both of the nozzle dividing wall and the housing dividing wall comprises a circumferentially extending groove, and wherein the sealing element comprises a laminar labyrinth seal ring.

17. The nozzle ring of claim 1, wherein the widening of the outer rim relative to the nozzle dividing wall is such that the nozzle dividing wall extends upstream of the nozzle vanes such that the outer rim is positioned radially outward into a region where the volutes begin to taper outward and the housing dividing wall thickens, allowing the outer rim to be made wider in a direction parallel to the turbine axis.

18. The nozzle ring of claim 1, wherein the widening of the outer rim relative to the nozzle dividing wall provides at least one of: (i) an increased distance between the first and second inlet volutes along the clearance between the outer cylindrical surfaces of the nozzle dividing wall and the inner edge of the housing dividing wall and (ii) an increased capacity of the outer rim to accommodate mechanical sealing features.

* * * * *